United States Patent [19]

Lindholm

[11] 4,366,214
[45] Dec. 28, 1982

[54] SEALING DEVICE

[75] Inventor: Alfons S. M. Lindholm, Lidingö, Sweden

[73] Assignee: Rolf Magnusson, Saltsjöbaden, Sweden; a part interest

[21] Appl. No.: 241,988

[22] Filed: Mar. 9, 1981

[30] Foreign Application Priority Data

Mar. 17, 1980 [SE] Sweden .................................. 8002078

[51] Int. Cl.³ ............................................. H01M 2/18
[52] U.S. Cl. ..................................... 429/140; 429/225; 429/238
[58] Field of Search ......... 429/140, 141, 238, 225–228

[56] References Cited

U.S. PATENT DOCUMENTS

| 3,014,975 | 12/1961 | Gumprecht et al. | 429/140 |
| 3,194,684 | 7/1965 | Wells | 429/140 |
| 4,025,701 | 5/1977 | Sundberg | 429/140 |
| 4,202,936 | 5/1980 | Guimond et al. | 429/225 X |
| 4,276,359 | 6/1981 | Sundberg | 429/140 |

Primary Examiner—Charles F. LeFevour
Attorney, Agent, or Firm—Townsend and Townsend

[57] ABSTRACT

A device for sealing the tubes (4) in a tubular electrode plate of an electrochemical lead cell comprising a top and a bottom part. The top part consists of separate sleeves (10) for each tube (4), which optionally are arranged on a connecting strip (14), each sleeve (10) having a bottom with a central through hole with a diameter corresponding to the diameter of the spine (2), which is to protrude therethrough, and a wall, the periphery of which corresponds to the periphery of the tubular casing (4) to butt thereagainst FIG. 2.

4 Claims, 5 Drawing Figures

SEALING DEVICE

The present invention relates to a device for sealing the tubes in a tubular electrode plate of an electrochemical lead-acid cell, comprising a top and a bottom part.

Tubular electrodes are used in electrochemical batteries of different kinds, as lead-acid batteries and different alkaline accumulators. In lead-acid batteries tubular electrodes are used instead of common pasted plates, especially when high demands are put on the life time of the battery.

A tubular electrode plate comprises a grid with a conductor common to all tubes, the top bar, from where separate spines extend, each one being surrounded by an active material enclosed in a tubular casing. In a tubular electrode of a lead-acid battery the grid consists of lead and the active material surrounding the spines of lead powder, i.e. a mixture of powdered lead monoxide and powdered metallic lead. The lead powder can also exist in the shape of granules, which result in a considerably improved handling and also an increased capacity. The tubular casing consists of an electrolyte permeable, inert material resistant to strong acids, e.g. glass fibres.

The tubes in an electrode plate are conventionally sealed at the bottom with a bottom bar which can consist of a connecting strip with plugs intended to be driven into the lower, free tube ends. The upper ends of the tubes facing the top bar are sealed by means of a direct fastening to the grid, the spines of which for this reason at the top are shaped with a bulging corresponding to the shape of the tube.

The grid constructions being used for tubular electrodes today are extremely clumsy and heavy. The gathering of lead in the upper part of the grid is considerable due to the shape of the spines with a lump of lead in the upper end for the sealing of the tubes. Despite many attempts to achieve a reduction of lead in lead batteries this construction has been maintained. The present invention makes it possible to achieve a considerable reduction of the quantity of lead in the grid and simultaneously also an increase of the quantity of active material, resulting in the electrode plate getting an increased capacity and a reduced weight.

The device according to the invention for sealing of the tubes in a tubular electrode plate is characterized in that the top sealing part consists of separate sleeves for each tube, which may be arranged on a connecting strip, each sleeve having a bottom with a central through hole with a diameter corresponding to the diameter of the spine which is to protrude therefrom, and a wall the periphery of which corresponds to the periphery of the tubular casing which is to butt thereagainst.

According to a preferred embodiment of the invention the top sealing part consists of a top strip with separate sleeves for each tube, each sleeve having an outer diameter corresponding to the inner diameter of the tubular casing, so that the tubular casing tightly fits the wall of the sleeve after the sealing.

The bottom sealing part, according to the invention consists of separate sleeves for each tube, which may be arranged on a connecting strip while forming a bottom bar, each sleeve having an outer wall with an inner diameter corresponding to the outer diameter of the tubular casing and an inner wall with an inner diameter corresponding to the diameter of the spine, so that, after sealing, the outer wall tightly fits around the tubular casing and the inner wall surrounds and centers the spine.

For the manufacture of a tubular electrode plate with a top and a bottom sealing part according to the invention a grid with a top bar and spines without lumps of lead is cast in one piece. The grid is turned with the top bar downwards and the sleeves in the top part are fitted over the respective spines with the sleeve openings turned upwards, so that the sleeve bottoms butt against the top bar. Thereafter the tubular casings are applied and pressed over each sleeve resulting in a sealing of the upper ends of the tubes, which are now turned downwards, and active material can be filled into the tubes. When the tubes are filled the bottom sealing part is finally applied, the sleeves of which are pressed over the lower, now upwardly turned ends of the tubes, whereby the spines are fixed into position by means of the inner wall of each sleeve. The plate can thereafter be turned right side up.

In order to facilitate the assembly of the top sealing part to the grid, the upper part of each spine should be shaped with a somewhat larger diameter, about one tenth of a mm larger, than the rest of the spine. This will make it easier to fit the sleeves over the spines so that these will pass through the holes in the bottom of the sleeves at the same time as a tight sealing is achieved when the sleeves are in place.

In the preferred embodiments of the sealing parts the sleeves and the connecting strip are made of the same material and suitably molded in one piece. It is important that the dimensioning of the walls and the bottoms of the sleeves is made so that the construction in its entirety becomes stable and continuous and that leakage between sleeve and tubular casing is prevented. It is also imperative that the material in the sealing parts is resistant to the surrounding environment and somewhat resilient, as the active electrode material encased in the tubes is "living" and changes its volume when charging and discharging.

Examples of materials which can be used for the construction of the sealing parts according to the invention are the following plastic materials: polystyrene, polyethylene, polypropene, polyphenylen oxide, polyvinyliden chloride, polysulphones, polysulphides, polytetrafluoro ethylene, polyvinyl chloride, polyurethane, epoxy resin, polycarbonate. Among these polystyrene, polypropene, polyethylene and polyvinyl chloride should be especially mentioned as being economically advantageous.

The sealing between tubular casing and sleeve can optionally be supplemented with an adhesive layer. The chosen adhesive must be compatible with both the material in the sleeve and the material in the tubular casing and furthermore be able to resist the highly aggressive environment in the cell. Epoxy resin could be mentioned as an example of a usable adhesive.

Yet another advantage with a sealing device according to the invention is that most grids for tubular electrodes can be cast in the same mold. As the construction of the sleeves can be adapted to the geometrical shape of the tubes the same grid can be used for different kinds of tubes. This results in a saving of both time and money.

For grids higher than 135 mm so called guide-fins could be necessary in certain cases, which guide-fins center the spine along its length. To be adapted to the invention said guide-fins can for example consist of plastic fins being snapped onto the spine after the application of the top sealing part.

The invention will be described further below with reference to the attached drawing, where FIG. 1 shows a vertical view partially in section of a conventional tubular electrode plate;

Figure 1:
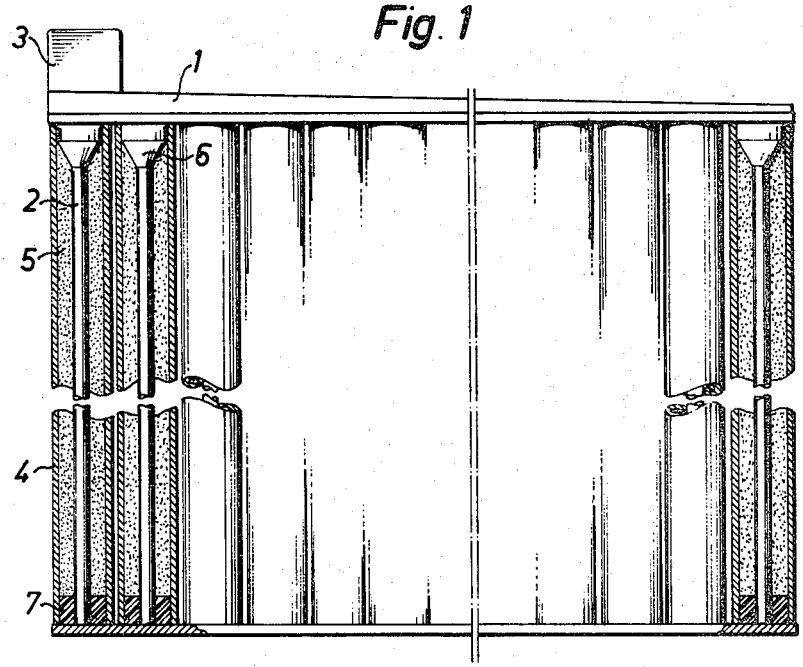
Figure 2:
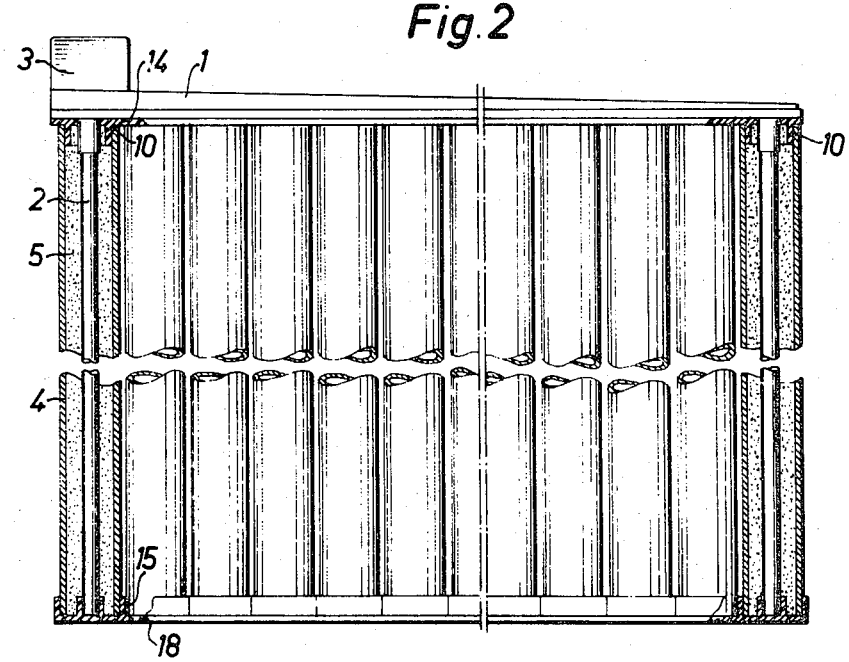
FIG. 2 shows a vertical view partially in section of a tubular electrode plate according to the invention.

A tubular electrode plate of a lead-acid battery with conventionally sealed tubes according to FIG. 1 and with a sealing device according to the invention in accordance with FIG. 2 comprises a lead grid with a top bar 1 and extending spines 2. For the feeding and drawing, respectively, of current there is a lug 3. Around each spine is an electrolyte permeable tubular casing 4 surrounding an active material 5, as lead powder.

In the conventional plate the top sealing of the tubes take place by fixing the upper ends of the tubular casings 4 around lumps of lead 6 on the spines 2. The lower ends of the tubular casings are sealed with plugs 7 fastened to a connecting strip. These plugs 7 have a recess for centering of the spines 2.

Figure 3:
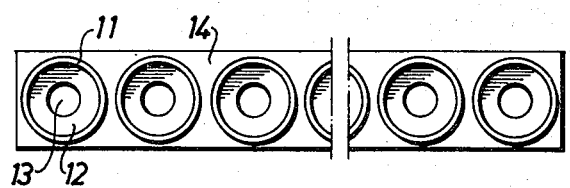
FIG. 3 shows a planar view of a top part for sealing circular tubes.
Figure 5:
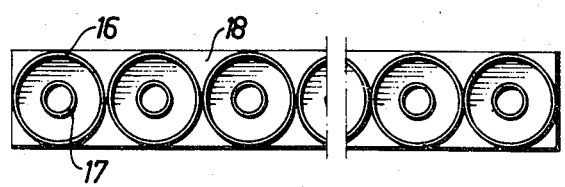
FIG. 5 shows a planar view of a bottom bar for sealing circular tubes.

In the electrode plate according to FIG. 2 the upper ends of the tubular casings 4 have been sealed by means of a top strip with sleeves 10, the detailed construction of which appears from FIG. 3. On a connecting strip 14 there is a sleeve for each tube with a wall 11 and a bottom 12. In the bottom 12 there is a hole 13, which tightly fits the protruding spine 2. The wall of the sleeve is tightly surrounded by the tubular casing 4. The lower ends of the tubular casings 4 have been sealed by means of a bottom bar with sleeves 15, the detailed construction of which appears from FIG. 5. On a connecting strip 18 there is a sleeve for each tube with an outer wall 16 and an inner wall 17. The outer wall 16 of the sleeve tightly fits the tubular casing 4 and the inner wall 17 surrounds and centers the spine 2.

Figure 4:
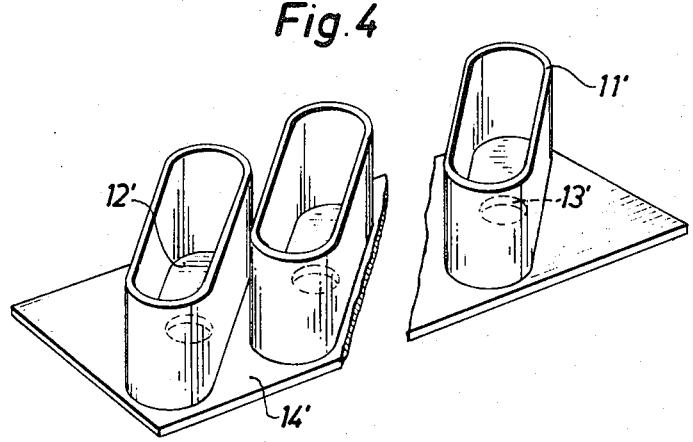
FIG. 4 shows a view in perspective of a top part for sealing oval tubes.

FIG. 4 shows a top part with sleeves on a connecting strip 14' which can be used for sealing oval tubular casings. The wall 11' of the sleeve hereby has been given the same construction as the tubular casing to be sealed and in the bottom 12' of the sleeve is a hole 13' which is adapted to a circular spine.

For a standard plate of a lead battery with a Pg 135 grid, i.e. with fifteen circular tubes and a height of 135 mm, an increased capacity of 5–6% and a total weight reduction of about 5% is achieved when utilizing a sealing device according to the invention. Through the fact that the lead grid can be manufactured without lumps of lead a reduction of the lead weight of 17–18% is achieved. At the same time the quantity of active material in each tube can be increased which means improved utilization of the available volume. By this construction the relation active material to lead becomes 1:07.

It should be noticed that also other embodiments of the sealing device according to the invention are feasible. The top sealing part for example can comprise sleeves the inner diameter of which corresponds to the outer diameter of the tubular casing whereby the wall of the sleeve surrounds the tube casing when sealing. Furthermore the sleeves can be adjusted to non-circular spines.

I claim:

1. Device for sealing the tubes in a tubular electrode plate of an electrochemical lead cell, comprising a tubular electrode plate having a lead grid with a conductor common to all tubes, a top bar (1), from which separate spines (2) extend, each one being surrounded by an active material (5) enclosed in a tubular casing (4), consisting of a top part for sealing the upper ends of the tubes facing the top bar and a bottom part for sealing the lower, free ends of the tubes, c h a r a c t e r i z e d in that the top sealing part including separate sleeves (10) for each tube, which are arranged on a connecting strip (14), each sleeve having a bottom (12) with a central through hole (13) with a diameter corresponding to the diameter of the spine (2), which is to protrude therethrough, and a wall (11) the periphery of which corresponds to the periphery of the tubular casing (4) which is to butt thereagainst.

2. Device according to claim 1, c h a r a c t e r i z e d i n that the top sealing part includes a top strip with separate sleeves (10) for each tube, each sleeve having an outer diameter corresponding to the inner diameter of the tubular casing (4), so that after sealing the tubular casing (4) tightly surrounds the wall (11) of the sleeve.

3. Device according to claim 1 or 2, c h a r a c t e r i z e d i n that the bottom sealing part includes separate sleeves (15) for each tube, which are arranged on a connecting strip (18) forming a bottom bar, each sleeve having an outer wall (16) with an inner diameter corresponding to the outer diameter of the tubular casing (4) and an inner wall (17) with an inner diameter corresponding to the diameter of the spine (2), so that, after sealing, the outer wall (16) tightly surrounds the tubular casing (4) and the inner wall (17) surrounds and centers the spine (2).

4. Device according to any one of claims 1 or 2 c h a r a c t e r i z e d i n that the part for sealing is manufactured of a plastic material, selected from the group consisting of polystyrene, polypropene, polyethylene and polyvinyl chloride.

* * * * *